May 9, 1961 T. H. RISK 2,983,347
VEHICLE CONTROL SYSTEM
Filed Aug. 7, 1958 2 Sheets-Sheet 1

T. H. RISK
INVENTOR.
E. C. McRAE
J. R. FAULKNER
BY T. H. OSTER
ATTORNEYS

May 9, 1961 T. H. RISK 2,983,347
VEHICLE CONTROL SYSTEM
Filed Aug. 7, 1958 2 Sheets-Sheet 2
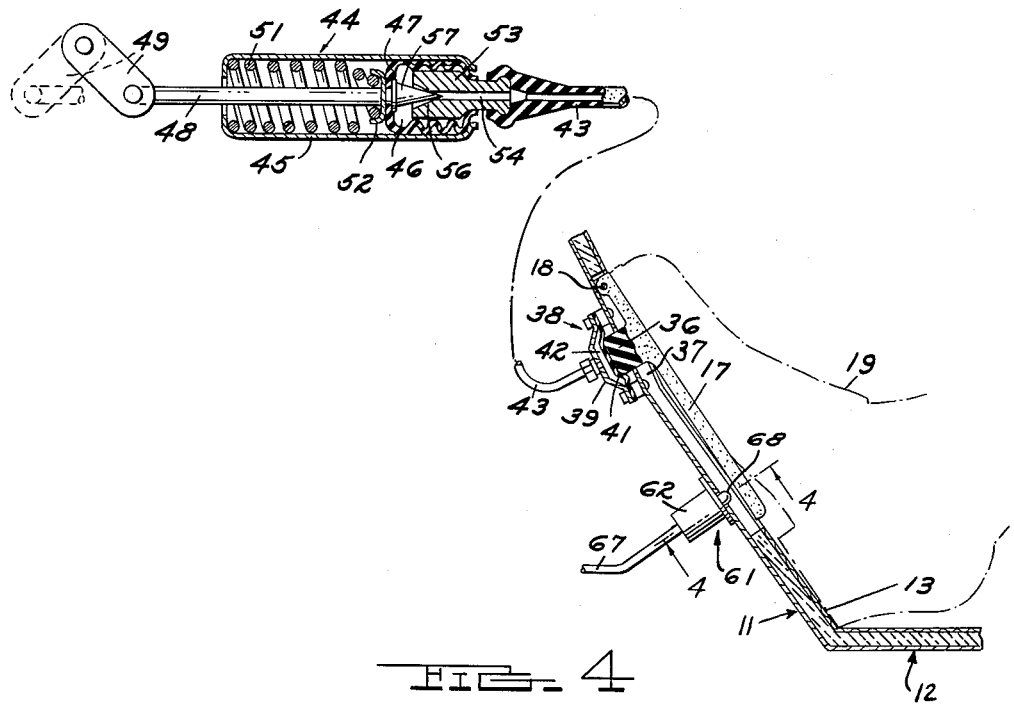
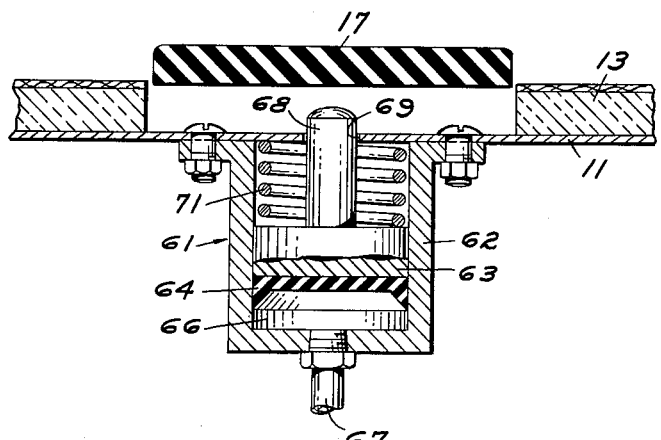
T. H. RISK
INVENTOR.
BY E. C. McRAE
J. R. FAULKNER
T. H. OSTER
ATTORNEYS

United States Patent Office 2,983,347
Patented May 9, 1961

2,983,347
VEHICLE CONTROL SYSTEM

Thomas H. Risk, Birmingham, Mich., assignor to Ford Motor Company, Dearborn, Mich., a corporation of Delaware Filed Aug. 7, 1958, Ser. No. 753,792

1 Claim. (Cl. 192—3)

This invention relates to a control system for a motor vehicle and particularly to a control system for braking and accelerating a motor vehicle.

An object of the present invention is to provide a motor vehicle control system in which the usual projecting brake and accelerator controls are eliminated and replaced by control mechanism incorporating short stroke pressure sensitive brake and accelerator controls. The invention contemplates a control system utilizing brake and accelerator pedals mounted substantially flush with the passenger compartment toe board, and located immediately adjacent with each other to facilitate the transfer of the driver's foot from one pedal to the other. The system achieves faster response through the use of reduced foot motion, and also achieves less driver fatigue through better foot and leg angles and reduced foot pedal effort and movement. These features promote greater safety and comfort.

A further object of the invention is to provide brake and accelerator controls for a motor vehicle utilizing hydraulic power means and effecting the operation of the vehicle brake and throttle with extremely small foot pedal movements. A still further object is to incorporate inhibitor means resisting and/or preventing the operation of the accelerator control when the brake control is applied to prevent the inadvertent simultaneous application of both the vehicle brake and accelerator controls.

Other objects and advantages of this invention will be made more apparent as this description proceeds, particularly when considered in connection with the accompanying drawings, wherein:

Figure 3 is a side elevational view, partly in section, of the accelerator control mechanism;

Figure 4 is an enlarged cross sectional view taken on the line 4—4 of Figure 3 and illustrating the accelerator inhibitor.

Figure 1:
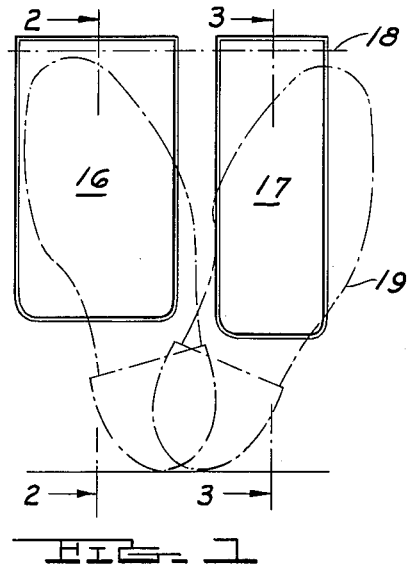
Figure 1 is a plan view of a portion of a motor vehicle incorporating the control system of the present invention.

Referring now to the drawings, the reference character 11 indicates a conventional toe board inclined upwardly and forwardly from the vehicle floor board 12, and providing a wall separating the engine and passenger compartments. A combined insulation and floor covering 13 is applied to the passenger compartment side of the toe board and floor board.

A pair of rectangularly shaped brake and accelerator pedals 16 and 17 are mounted upon the toe board 11 immediately adjacent each other and substantially flush with the floor covering 13 in the inoperative positions of the pedals. Each pedal is pivotally mounted at its upper end upon the toe board 11 for pivotal movement about a common transversely extending axis 18. The upper surfaces of the two pedals are coplanar so that the driver's foot, shown diagrammatically at 19, may be readily swung from one pedal to the other to eliminate the time interval between accelerator and brake application and to provide a safety factor.

Figure 2:
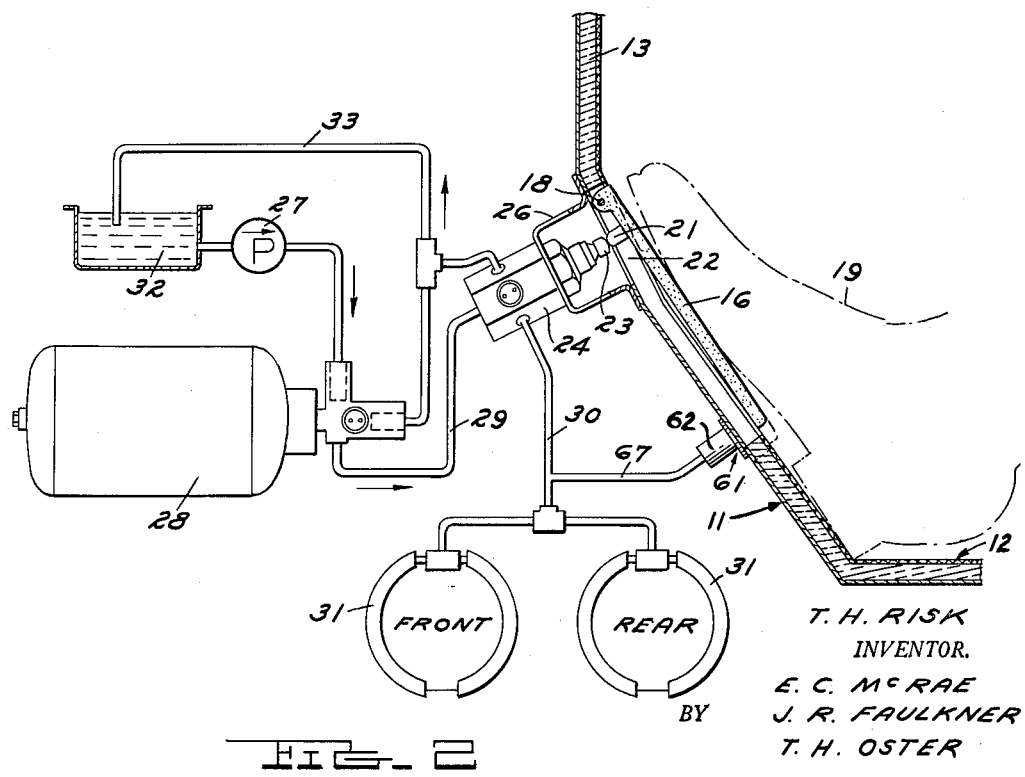
Figure 2 is a semi-diagrammatic side elevational view, partly in section, illustrating the brake control mechanism.

Referring now to Figure 2, it will be seen that the brake pedal 16 has a downwardly depending lug 21 near its pivotal axis 18 and projecting through an opening 22 in the vehicle floor covering 13 and the toe board 11. The brake pedal lug 21 engages the stem 23 of a brake control valve 24 carried by a bracket 26 mounted upon the toe board 11 directly beneath the brake pedal.

A power driven source of fluid pressure 27 charges a fluid accumulator 28 at a relatively high pressure. A fluid pressure conduit 29 connects the accumulator 28 with the valve 24, and the valve is connected by a conduit 30 to conventional hydraulically actuated wheel brakes 31 located at the front and rear wheels of the vehicle. Upon application of the brake pedal 16 through a relatively short stroke valve 24 admits fluid pressure to the brakes to apply the latter. When released, fluid from the brakes is returned to a reservoir 32 through a return conduit 33. It will be seen that the construction is such that an extremely short movement of the brake pedal 16 serves to actuate the brakes.

Referring now to Figure 3, it will be seen that the accelerator pedal 17 has a downwardly depending integral lug 36 adjacent its upper pivoted end, the lug 36 projecting through an opening 37 in the vehicle floor covering 13 and toe board 11.

A hydraulic servo or transmitting unit 38 is mounted upon the toe board 11 directly beneath the accelerator pedal 17 and in alignment with the accelerator lug 36. The servo unit 18 comprises a metallic housing 39 bolted to the toe board, and provided with a flexible diaphragm 41 forming an enclosed fluid chamber 42 between the diaphragm and the housing. The accelerator lug 36 engages the flexible diaphragm 41, and a slight movement of the accelerator pedal will force a relatively large quantity of fluid through the small diameter conduit 43 connected to the servo unit 38. The opposite end of the conduit 43 is connected to a hydraulic motor or receiving unit 44 having a fluid chamber 46 formed therein by means of a bellows 47. The bellows 47 is connected by a rod 48 to the carburetor throttle arm 49. A coil spring 51 within the housing 45 of the receiving unit acts upon a spring retainer 52 to urge the bellows 47 and actuating rod 48 toward a released position in which the carburetor throttle arm is in its inoperative position.

The relative sizes of the hydraulic servo unit 38, the hydraulic motor unit 44 and the interconnecting conduit 43 are selected so that a very small movement of the accelerator pedal 17 is sufficient to move the carburetor throttle arm 49 throughout its stroke, thus making it possible for the accelerator pedal 17 to be substantially flush with the toe board 11 of the vehicle, and to minimize the foot movement necessary to operate the throttle control.

Referring again to Figure 3 it will be seen that the conduit 43 is connected to a fitting 53 carried at one end of the motor unit 44 and having a passageway 54 therethrough. The end 56 of the passageway 54 is enlarged and is adapted to be controlled by a tapered projection 57 at the end of the rod 48. When the accelerator is released the tapered projection 57 cooperates with the end 56 of the passageway 54 to wire-draw the fluid in the fluid chamber 46 and to dampen the fluid return to the servo unit 38 to prevent a too rapid release of the carburetor throttle arm 49, thus preventing stalling the engine.

With reference particularly to Figures 2 and 4, the reference character 61 indicates an inhibitor unit comprising a housing 62 mounted upon the under side of the toe board 11 directly beneath the accelerator pedal 17.

A piston 63 is slidably contained within the cylinder and has a resilient cup 64 at one end to form a fluid pressure chamber 66 connected by means of a conduit 67 to the brake conduit 30 leading to the wheel brakes 31. The piston 63 has a piston rod 68 projecting through an opening 69 in the toe board 11 and floor covering 13, and adapted to engage the under side of the accelerator pedal 17. A return spring 71 acts on the piston 63 to normally urge the piston downwardly away from the pedal.

When the brake pedal is actuated to operate the brake control valve 24 and admit fluid under high pressure from the accumulator 28 to the wheel brakes 31, the conduit 67 admits fluid pressure to the inhibitor chamber 66 to move the piston 63 upwardly against the bias of the spring 71. The spring 71 is selected to resist movement of the piston 63 until a predetermined brake line pressure is reached. During this interval both the brake and accelerator pedals may be simultaneously manipulated, if desired, for a maneuvering operation. When a higher brake line pressure is reached, however, the spring resistance will be overcome and the inhibitor piston 63 will be forced upwardly to bring the piston rod 68 into engagement with the accelerator pedal 17 to prevent the accelerator pedal from being operated by the driver. With this arrangement, unintentional simultaneous operation of the brakes and accelerator is prevented. This provides a safety feature, since in a panic brake application it is possible that the driver's foot might not be completely removed from the accelerator pedal, and the resutling increase in acceleration would be determined to the safe control of the vehicle. During normal vehicle operation the inhibitor unit 61 is inoperative and the accelerator pedal may be operated in normal fashion.

It will be seen that the present construction provides adjacent brake and accelerator pedals mounted substantially flush with the toe board and arranged for alternate operation by the right foot of the driver. A faster pedal application is thus possible contributing to the safe operation of the vehicle, and the above described inhibitor unit prevents inadvertent operation of the accelerator pedal during full braking action. The short stroke of the accelerator and brake pedals eliminates the conventional projecting pedals and makes possible a more convenient and comfortable driver position as well as lessening driver fatigue resulting from the lifting of the driver's foot to an operating position on the conventional pedal and the depression and retraction of his foot during pedal operation.

It will be understood that the invention is not to be limited to the exact construction shown and described, but that various changes and modifications may be made without departing from the spirit and scope of the invention, as defined in the appended claims.

What is claimed is:

In a control system for a motor vehicle having engine acceleration control means, a hydraulic wheel brake, a passenger compartment toeboard, comprising a short stroke foot operated accelerator pedal pivotally mounted at its upper edge upon said toeboard and lying closely adjacent the plane thereof in its released position, a short stroke foot operated brake pedal pivotally mounted at its upper edge upon said toeboard adjacent said accelerator pedal and lying approximately in the plane of said accelerator pedal when the brake pedal is in its released position, a hydraulic servo unit mounted upon said toeboard beneath said accelerator pedal, a hydraulic motor unit connected to said engine acceleration control means to operate the latter, a relatively small diameter fluid conduit connecting said servo unit and said motor unit, a source of fluid pressure, a second conduit connecting said fluid pressure source to said wheel brake, a valve controlling said second conduit and mounted upon said toeboard beneath said brake pedal for actuation thereby, a hydraulic motor unit mounted upon said toeboard beneath said accelerator pedal and having a part projecting upwardly for engagement with said accelerator pedal, a third conduit connecting said last-mentioned motor unit to said second conduit to actuate said motor unit when said wheel brake is applied and to urge said accelerator pedal toward its inoperative position, and said last-mentioned motor unit having spring means to provide a minimum limit under which the hydraulic pressure of said wheel brake will not be sufficient to cause said last-mentioned motor unit to be actuated.

References Cited in the file of this patent
UNITED STATES PATENTS

| | | |
|---|---|---|
| 2,203,777 | Detmers | June 11, 1940 |
| 2,642,165 | Banker | June 16, 1953 |
| 2,642,166 | Strauss | June 16, 1953 |
| 2,662,622 | Rodeback | Dec. 15, 1953 |
| 2,713,404 | Rodeback | July 19, 1955 |